(12) United States Patent
Hammond

(10) Patent No.: US 7,900,802 B2
(45) Date of Patent: Mar. 8, 2011

(54) FORK CROWN SUPPORTED BICYCLE CARRIER

(76) Inventor: Malcolm Thomas Hammond, North Vancouver (CA)

( * ) Notice: Subject to any disclaimer, the term of this patent is extended or adjusted under 35 U.S.C. 154(b) by 768 days.

(21) Appl. No.: 10/782,174

(22) Filed: Feb. 20, 2004

(65) Prior Publication Data

US 2007/0119889 A1    May 31, 2007

(51) Int. Cl.
*B60R 11/00* (2006.01)
*B60R 9/00* (2006.01)

(52) U.S. Cl. .................................. 224/521; 224/924

(58) Field of Classification Search .......... 224/518–521, 224/924, 509, 532, 488, 495, 530, 534; 211/19, 211/17
See application file for complete search history.

(56) References Cited

U.S. PATENT DOCUMENTS

| | | | |
|---|---|---|---|
| 4,171,077 A | 10/1979 | Richard, Jr. | |
| 5,067,641 A * | 11/1991 | Johnson et al. | 224/501 |
| 5,211,323 A * | 5/1993 | Chimenti et al. | 224/314 |
| 5,526,971 A * | 6/1996 | Despain | 224/519 |
| 5,558,261 A * | 9/1996 | Hedeen | 224/511 |
| 5,647,521 A * | 7/1997 | Burgess | 224/534 |
| 5,803,330 A | 9/1998 | Stack | |
| 5,871,131 A * | 2/1999 | Low et al. | 224/537 |
| 5,996,870 A | 12/1999 | Shaver | |
| 6,010,049 A | 1/2000 | Stein | |
| 6,123,498 A * | 9/2000 | Surkin | 414/462 |
| 6,435,523 B1 | 8/2002 | Hilk | |
| 6,491,195 B1 * | 12/2002 | McLemore et al. | 224/537 |
| 6,516,986 B1 | 2/2003 | Lassanske | |
| 6,834,786 B2 * | 12/2004 | Hansen | 224/403 |
| 2001/0035446 A1 | 11/2001 | Walstrom | |

FOREIGN PATENT DOCUMENTS

| | | |
|---|---|---|
| DE | 3890700 C2 * | 12/1996 |
| EP | 95548 A2 * | 12/1983 |
| EP | 0721 860 A1 | 7/1996 |
| GB | 2 327 655 A | 3/1999 |
| WO | WO 89/01883 | 3/1989 |
| WO | WO 03/064214 A1 | 8/2003 |

* cited by examiner

*Primary Examiner* — Nathan J Newhouse
*Assistant Examiner* — Corey N Skurdal
(74) *Attorney, Agent, or Firm* — Cameron IP

(57) ABSTRACT

A vehicle mounted bicycle carrier for transporting non-standard bicycle frame types, such as full suspension mountain bikes. The carrier typically is mounted to the hitch structure of a vehicle and is comprised of a vertical support mast, with a top mounted horizontal bar, containing cradles for hanging bicycles from their fork crowns in a vertical position, providing independent access. The cradle design turns the fork and handlebars to a degree that prevents interference with an adjacent bicycle's handlebars, thereby allowing the closest possible spacing. Lower down on the vertical support mast is a horizontal bar for securing the bicycle rear wheels, preventing the bicycles from swinging freely on the cradles.

8 Claims, 7 Drawing Sheets

US 7,900,802 B2

FORK CROWN SUPPORTED BICYCLE CARRIER

CROSS REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The present invention relates to a vehicle mountable bicycle carrier, particularly to a bicycle carrier that retains a bicycle in a vertical position for the convenient loading and unloading of standard and non-standard bicycle frame designs.

Bicycles are often transported between locations on carriers which attach to vehicles. In many cases, these carriers incorporate an arm or cradle that the top tube of a bicycle rests on or in, to support the bicycle. However, women's bicycles and many newer non-traditional frames, especially full suspension mountain bikes, do not have a top tube. As a result, these types of bicycles cannot be directly mounted on many carriers.

Several designs aim to overcome this problem. One such design places the bicycle on top of the vehicle by removing the front wheel and clamping to the exposed ends of the bicycle fork. Problems with this design include the hassle associated with removing the front wheel, and the need to store the wheel elsewhere. Also the bicycle needs to be lifted up high and placed on top of the vehicle. Another design incorporates a surrogate top tube, as described by Hilk in U.S. Pat. No. 6,435,523, Aug. 20, 2002, whereby a tube is attached to the handlebars and seat post of a bicycle and the bicycle and attached tube is then affixed to a bicycle carrier. This design requires the user to attach the device to the bicycle in two different places, and then to attach the device to the bicycle carrier, adding greatly to the amount of time needed to attach the bicycle to the vehicle. Other designs carry a bicycle behind a vehicle via cradles in which the bicycle wheels sit. This style of bicycle carrier is generally large, complicated, and cumbersome, especially for ones which carry a plurality of bicycles. Another common design of hitch mounted bicycle carrier simply stacks the bicycles on a fork or similar structure, requiring the removal of the outermost bicycles to access the innermost bicycles.

2. Objects and Advantages

Several objects and advantages of the present invention include:

a) to provide a vehicle mountable bicycle carrier capable of carrying any bicycle regardless of its frame design.
 b) to provide a vehicle mountable bicycle carrier which is easy to use.
 c) to provide a vehicle mountable bicycle carrier which carries one or more bicycles without the removal of any part of any bicycle.
 d) to provide a vehicle mountable bicycle carrier which carries a plurality of bicycles and does not require the removal of any bicycle to access another bicycle.
 e) to provide a vehicle mountable bicycle carrier which is not overly complex and cumbersome.

SUMMARY

The present invention provides a vehicle hitch mountable bicycle carrier consisting of an upper bar containing cradles made up of paired V shaped tines, in which the crown of a bicycle fork fits. The bicycle hangs from its fork crown in a near vertical orientation, hooked by a cradle on the carrier's upper bar. Furthermore the cradles are orientated such that the bicycle's front wheel and handlebars are turned enough to facilitate the close proximity of another bicycle. The rear wheel is affixed to the carrier's lower bar by a hook or other device.

DRAWINGS—FIGURES

REFERENCE NUMERALS

| | |
|---|---|
| 10 | bicycle carrier |
| 11 | vehicle |
| 12 | tines |
| 13 | fork crown cradle |
| 14 | horizontal upper bar |
| 15 | V-shape base |
| 17 | arms |
| 18 | vertical support mast |
| 19 | hitch attachment bar |
| 20 | rear wheel horizontal stabilizer bar |
| 22 | J-hook and knob |
| 24 | vehicle hitch structure |
| 25 | stabilizer offset tube |
| 26 | bicycle |
| 27 | bicycle rear wheel |
| 28 | bicycle fork tubes |
| 30 | bicycle fork crown |
| 32 | bicycle head tube |
| 34 | handlebars |
| 35 | distal ends |

DETAILED DESCRIPTION—PREFERRED EMBODIMENT

Figure 1:
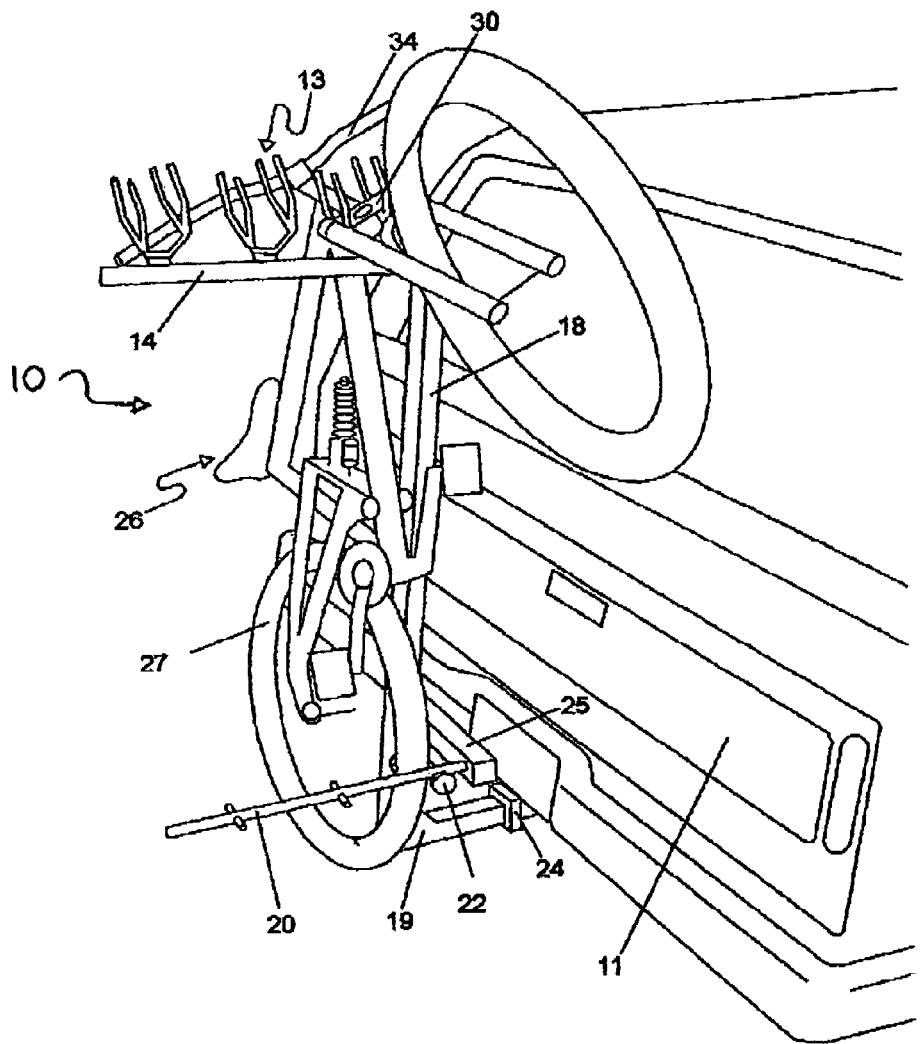
FIG. 1 is a perspective view of a vehicle with the hitch mounted bicycle carrier having a bicycle mounted thereon.

Referring to FIG. 1, the bicycle carrier described herein is shown mounted proximate to the rear of a vehicle 11 for the convenient transport of at least one bicycle 26. In a preferred embodiment the bicycle carrier is attached to the vehicle 11 through a hitch structure 24 substantially mounted to the vehicle 11. The bicycles 26 are removably secured within the bicycle carrier for transport by the vehicle 11 and subsequent removal and use at the destination.

Figure 2:
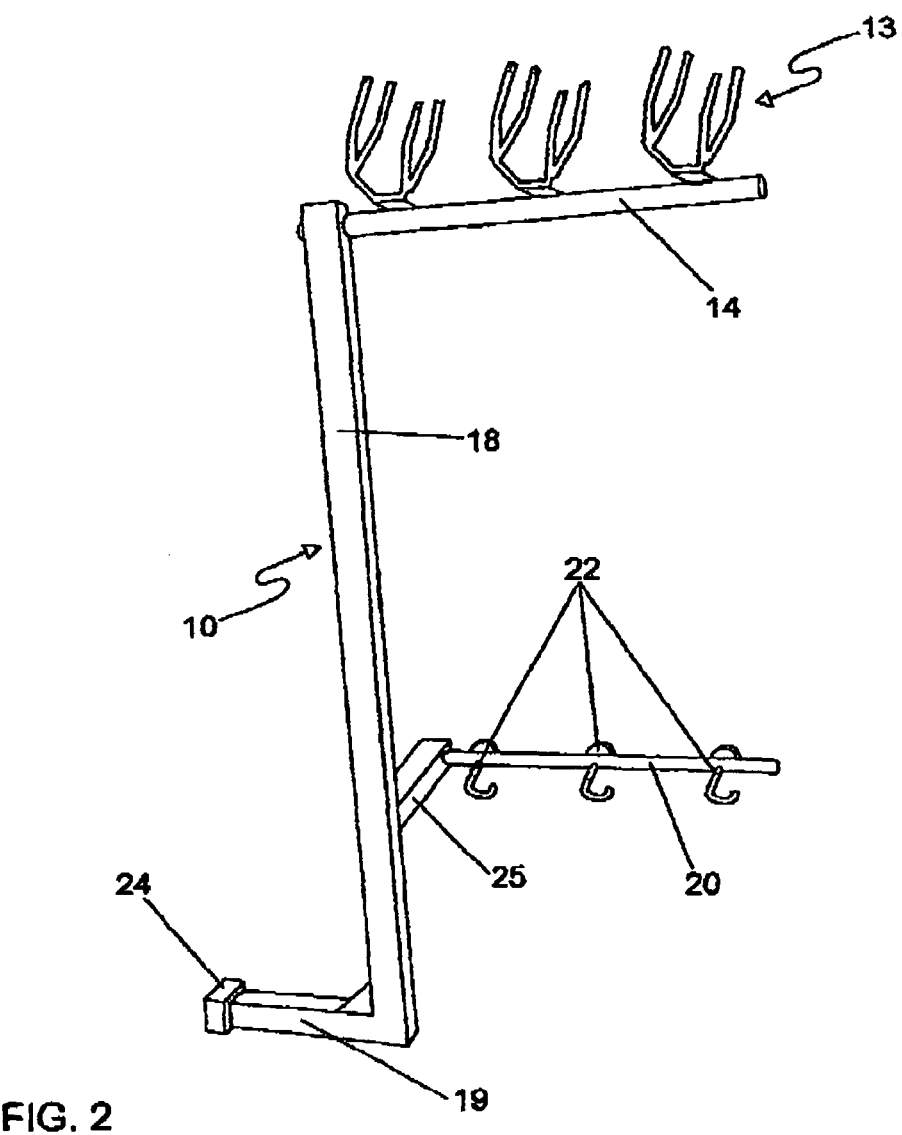
FIG. 2 is a side view of the bicycle carrier mounted to a vehicle hitch.
Figure 3:
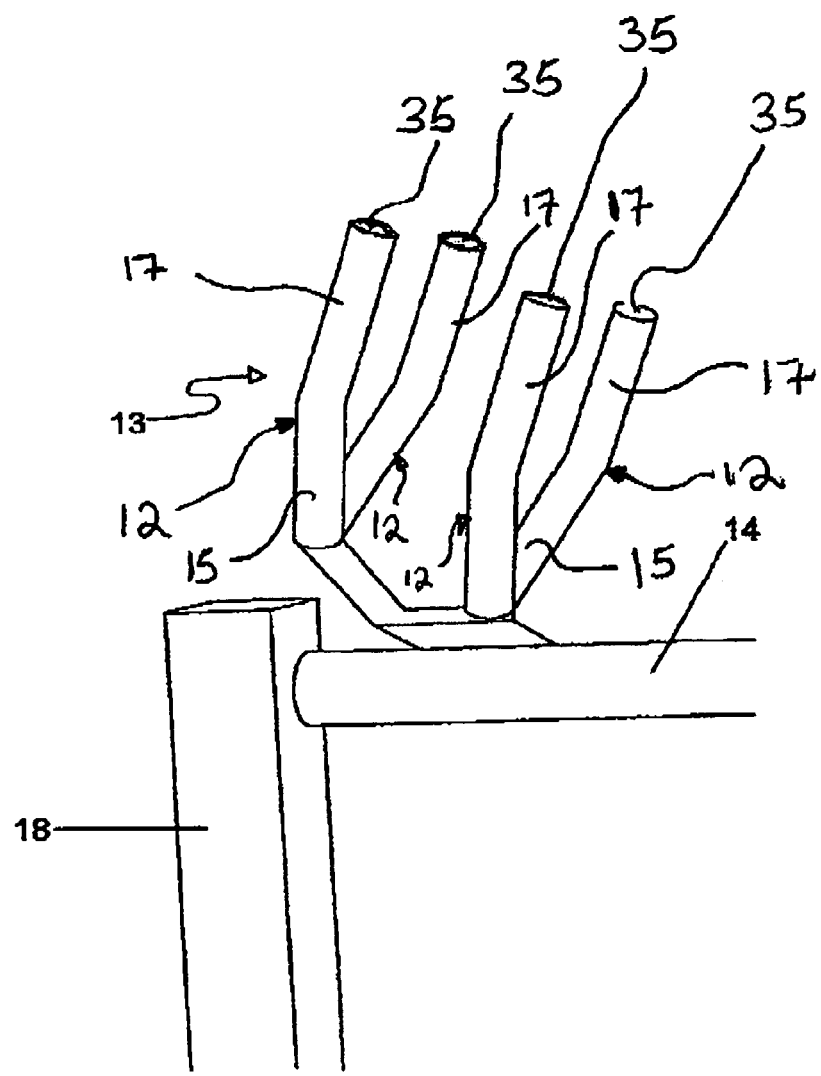
FIG. 3 is a perspective side view of a fork crown cradle on the carrier's upper bar.

FIG. 2 shows the bicycle carrier 10 attached to a vehicle hitch structure 24. The described embodiment of the bicycle carrier 10 has a horizontal upper bar 14 with a plurality of cradles called fork crown cradles 13, attached to a horizontal upper bar 14. A fork crown cradle 13, shown in FIG. 3, is comprised of four tines 12 approximately five inches in length, arranged into two V-shaped structures 15, with a V-angles of approximately 70 degrees, spaced approximately four inches apart. Arms 17 form the top half of the tines 12 and are parallel to each other. Each of the tines 12 has a corresponding free distal end 35. The fork crown cradles 13 can be set at an angle between 0 and 90 degrees from the longitudinal axis of the horizontal upper bar 14. In the described embodiment in FIG. 1 and FIG. 2 the fork crown cradles 13 are at an angle of approximately 45 degrees from the longitudinal axis of the horizontal upper bar 14. Each fork crown cradle 13 is spaced at a distance from an adjacent fork crown cradle 13 to allow the closest possible proximity of another bicycle, about 7 inched in the described embodiment. The horizontal upper bar 14, best shown by FIG. 2, is attached to the vertical support mast 18, and the lowermost end of the vertical support mast 18 is affixed to the bicycle carrier hitch attachment bar 19. The bicycle carrier hitch attachment bar 19 is simply slid into a receiver style vehicle hitch structure 24. At a point on the vertical support mast 18 located approximately one bicycle wheelbase length down from the horizontal upper bar 14, is the rear wheel horizontal stabilizer bar 20. In the described embodiment the rear wheel horizontal stabilizer bar 20 is offset to the right by approximately ½ of a bicycle wheel diameter, as viewed from behind, by the stabilizer offset tube 25. Spaced equidistant on the rear wheel stabilizer bar 20 and centered with respect to the fork crown cradles 13 on the horizontal upper bar 14, are j-hook and knob devices 22. The J-hook and knob devices 22 are simply hooks with threads and a knob on the non-hooked end, which pass through holes in the rear wheel stabilizer bar 20, and are used to secure a bicycle rear wheel, see FIG. 7.

Figure 4:
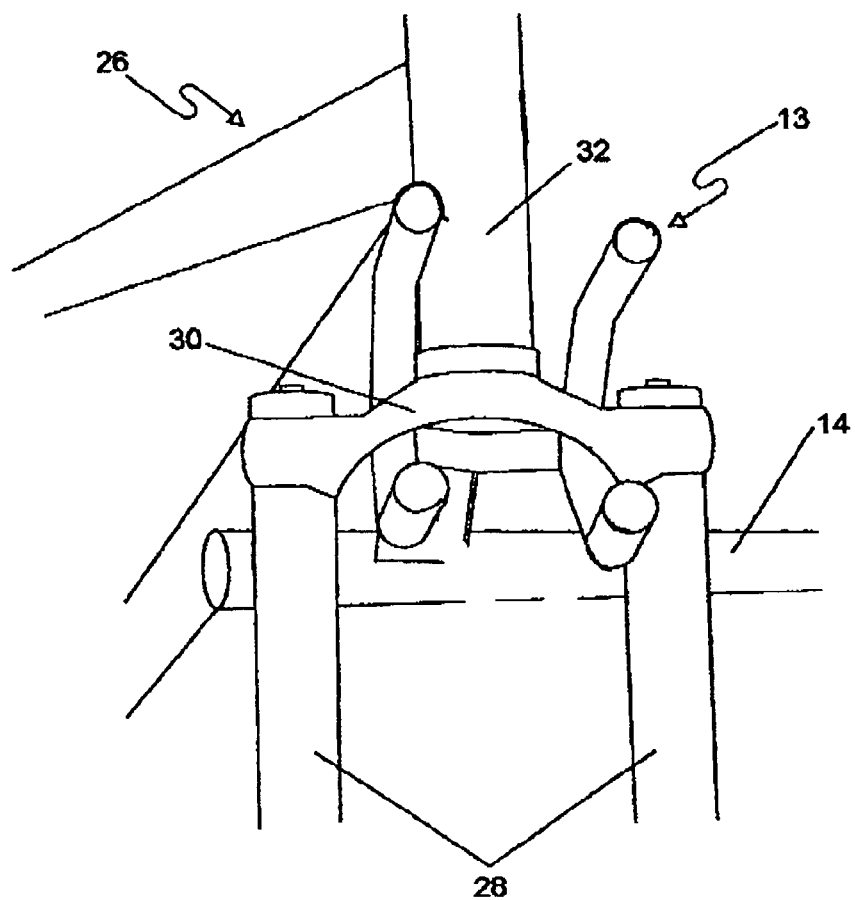
FIG. 4 is a perspective top view of a fork crown cradle, showing the cradle to bicycle fork crown interface.
Figure 5:
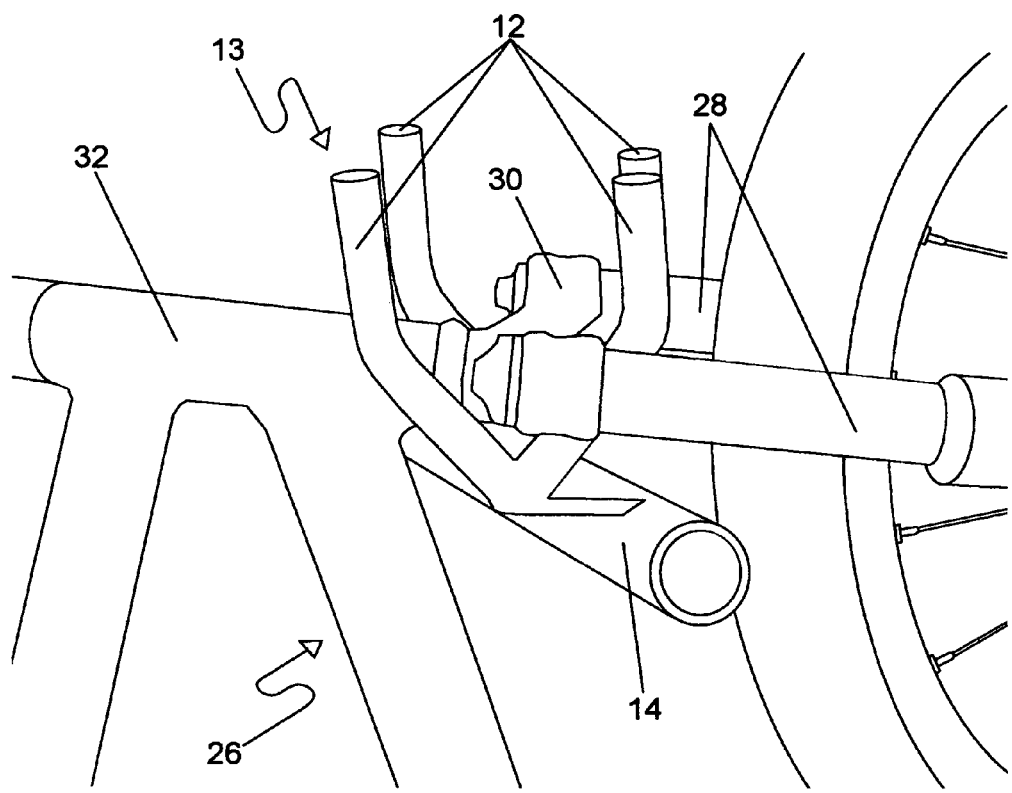
FIG. 5 is an end view of a fork crown cradle showing the interface of a bicycle fork crown and the cradle.

FIG. 3, FIG. 4 and FIG. 5 are close in views of a fork crown cradle 13 comprised of one pair of V shaped paired tines 12. FIG. 4 is an overhead view looking down on one fork crown cradle 13, showing the bicycle fork crown 30 and the bicycle head tube 32, contained within the fork crown cradle 13 and showing the bicycle fork tubes 28 running outboard of the tines 12, and the bicycle head tube 32 running inboard of the tines 12. As viewed in FIG. 5, the bicycle fork crown 30 is placed between the 2 leftmost and 2 rightmost tines 12.

Figure 6:
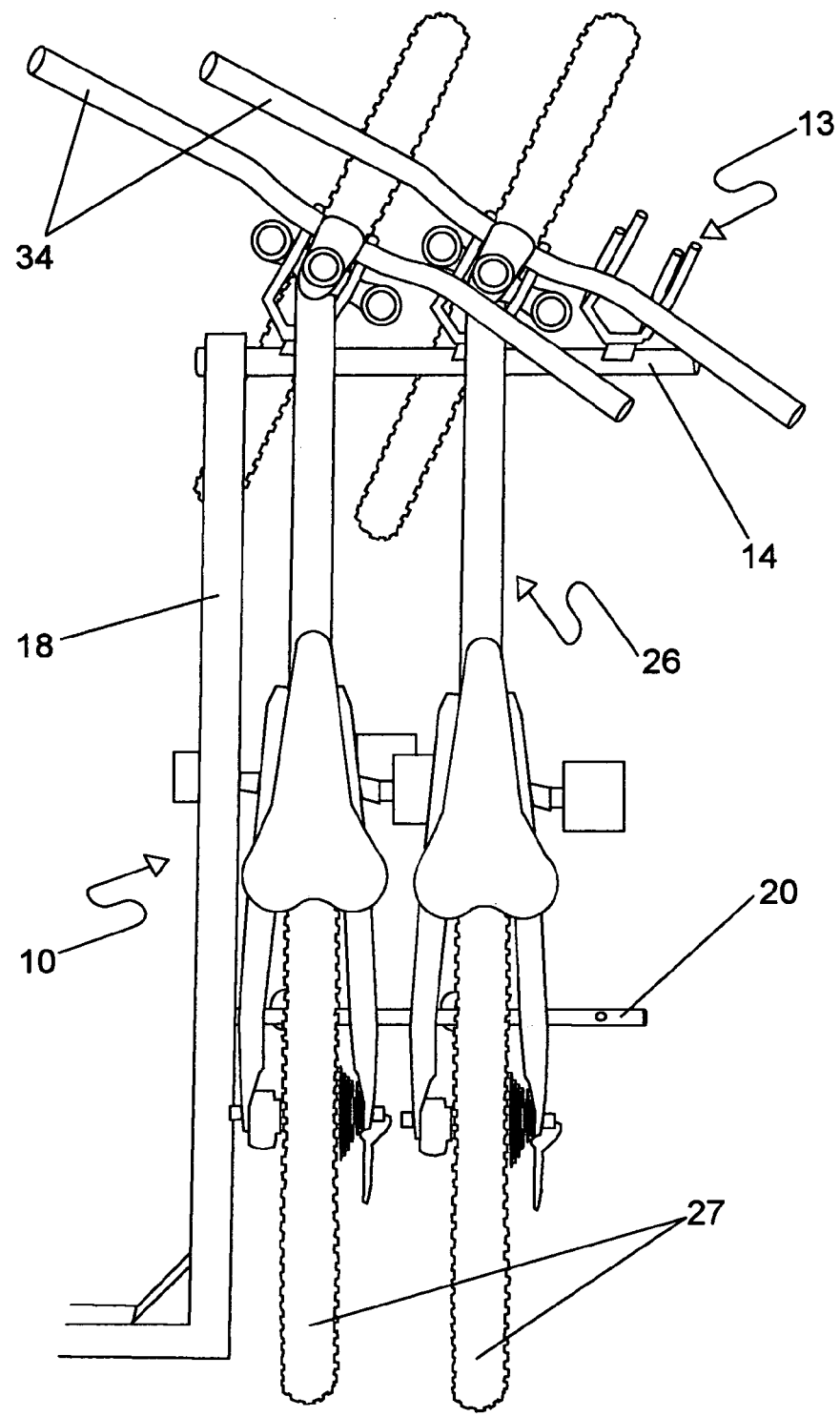
FIG. 6 is a side view of the bicycle carrier showing how the angled mounting of the bicycle handlebars facilitates the close proximity of the bicycles.

As shown in FIG. 6 the close mounting of adjacent bicycles 26 is facilitated by the fork crown cradles 13 being set at an angle of approximately 45 degrees from the horizontal upper bar 14. This angle inherently turns the bicycle fork and most importantly the handlebars 34 to approximately the same angle, thereby eliminating interference with another bicycle's handlebars, mounted to an adjacent fork crown cradle 13.

Figure 7:
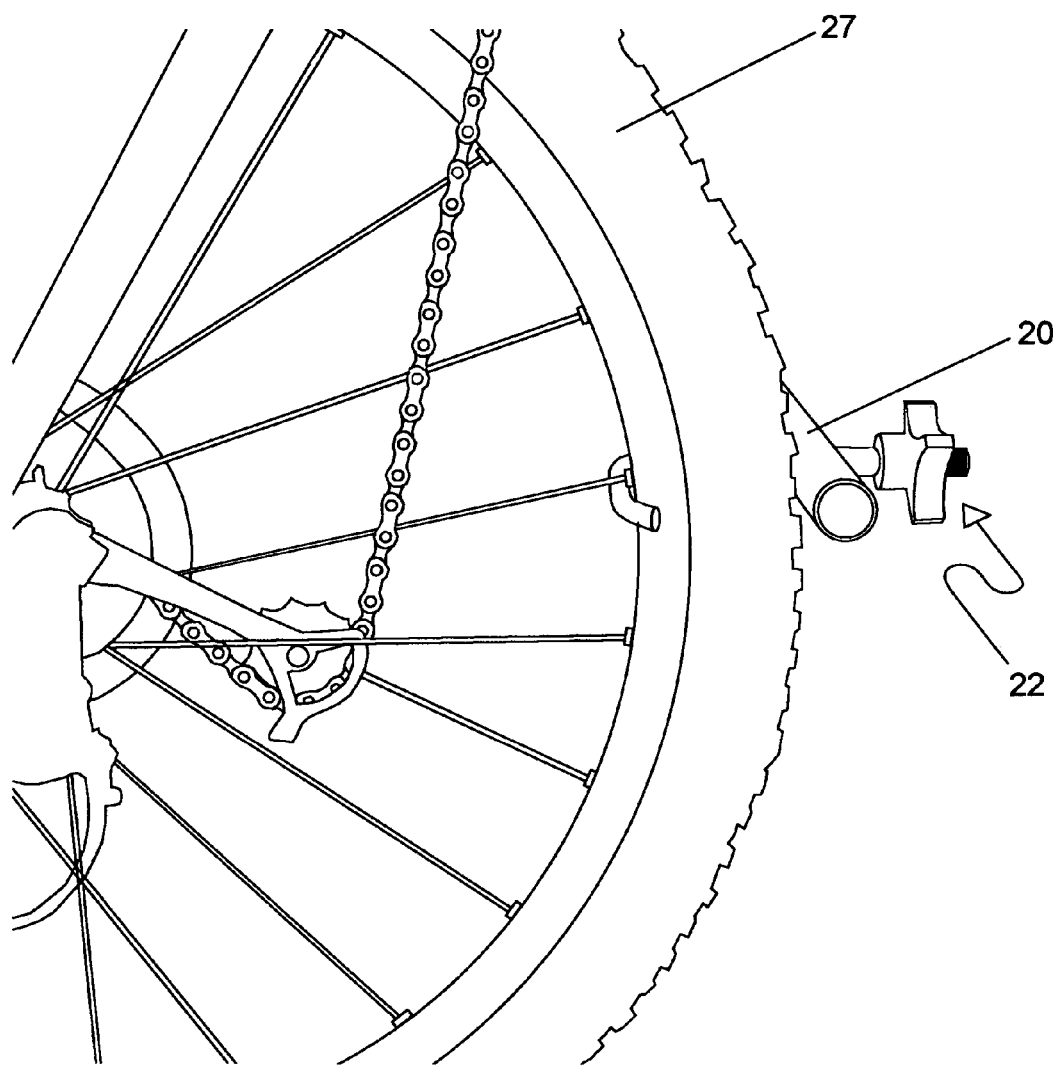
FIG. 7 is a side view of a bicycle rear wheel secured to the rear wheel stabilizer bar by a J-hook and knob device.

FIG. 7 shows how the rear wheel of the bicycle 27 is secured against the rear wheel stabilizer bar 20 by a J-hook and knob device 22. This device consists of a hooked metal rod mounted through a hole in the rear wheel stabilizer bar 20. The straight end is threaded with a knob attached. The rear wheel of the bicycle is simply hooked by the J-hook and tightened against the rear wheel stabilizer bar 20 by the knob.

CONCLUSION

The reader will see that the bicycle carrier of this invention can be used to transport, by vehicle, any bicycle with a front fork, encompassing virtually all known bicycle designs. The carrier design allows the quick and convenient loading and unloading of bicycles, without the need to remove any bicycle to access another. Furthermore the design provides an efficient way to carry as many bicycles as possible, in as little space as possible, by turning the handlebars, thereby preventing interference.

I claim:

1. A bicycle carrier for receiving a fork crown of a bicycle, the bicycle carrier comprising:
    a support mast;
    a hitch attachment bar extending generally perpendicular from the support mast;
    a first elongate support member extending generally perpendicular from the support mast;
    a second elongate support member connected to the support mast and extending substantially parallel to the first elongate support member;
    a cradle fixedly disposed along the first elongate support member, the cradle including four rods wherein each of the rods extends away from the first elongate support member and each of the rods has a free distal end, a first pair of the rods forming a first base structure from which the rods thereof further extend and a second pair of the rods forming a second base structure from which the rods thereof further extend, a first portion of the crown fork being received between the first pair of the rods and a second portion of the crown fork being received between the second pair of the rods; and
    means for securing a wheel of said bicycle to the bicycle carrier, said means being disposed along the second elongate support member.

2. A bicycle carrier as claimed in claim 1 wherein a first pair of the rods form a V-shaped base structure from which the rods thereof further extend.

3. A bicycle carrier as claimed in claim 2 wherein the rods extend parallel to each other from the V-shaped base structure.

4. A bicycle carrier as claimed in claim 2 wherein a second pair of the rods form a V-shaped base structure from which the rods thereof further extend.

5. A bicycle carrier as claimed in claim 1 wherein the first pair of the rods and second pair of the rods are spaced-apart from each other.

6. A bicycle carrier as claimed in claim 1 wherein the means for securing the wheel of said bicycle to the bicycle carrier includes a J-hook.

7. A bicycle carrier as claimed in claim 1 further including an offset bar for connecting the second elongate support member to the support mast and offsetting the second elongate support member from the first elongate support member.

8. A bicycle carrier as claimed in claim 1 further including a plurality of cradles disposed along the first elongate support member and corresponding means for securing the wheel of said bicycle to the bicycle carrier disposed along the second elongate support member.

* * * * *